(12) United States Patent
Cooley et al.

(10) Patent No.: US 6,276,465 B1
(45) Date of Patent: Aug. 21, 2001

(54) METHOD AND APPARATUS FOR DETERMINING POTENTIAL FOR DRILL BIT PERFORMANCE

(75) Inventors: Craig Hodges Cooley, South Ogden, UT (US); David Alexander Curry, Stonehaven (GB); Leroy William Ledgerwood, III, Cypress, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/511,619

(22) Filed: Feb. 23, 2000

Related U.S. Application Data

(60) Provisional application No. 60/121,346, filed on Feb. 24, 1999.

(51) Int. Cl.[7] .............................. E21B 44/00; G06F 15/18
(52) U.S. Cl. ................................ 175/24; 175/45; 166/66; 706/47
(58) Field of Search .................................. 175/24, 27, 39, 175/45, 48; 166/66, 50, 55; 706/45, 47, 48, 60, 904

(56) References Cited

U.S. PATENT DOCUMENTS

| | | |
|---|---|---|
| 4,507,735 | 3/1985 | Moorhead . |
| 4,852,399 | 8/1989 | Falconer . |
| 4,914,591 | 4/1990 | Warren et al. . |
| 4,926,686 | 5/1990 | Fay . |
| 4,928,521 | 5/1990 | Jardine . |
| 5,181,172 | 1/1993 | Whitten . |
| 5,216,917 | 6/1993 | Detournay . |
| 5,305,836 | 4/1994 | Holbrook et al. . |
| 5,318,136 * | 6/1994 | Rowsell et al. ........................ 175/24 |
| 5,390,748 * | 2/1995 | Goldman ................................ 175/24 |
| 5,415,030 | 5/1995 | Jogi . |
| 5,416,697 | 5/1995 | Goodman . |
| 5,417,295 * | 5/1995 | Rao et al. .............................. 175/40 |
| 5,637,795 | 6/1997 | Hale et al. . |
| 5,660,239 | 8/1997 | Mueller . |
| 5,730,234 | 3/1998 | Putot . |
| 5,787,022 | 7/1998 | Tibbitts et al. . |
| 5,794,720 | 8/1998 | Smith et al. . |
| 5,842,149 | 11/1998 | Harrell . |
| 6,112,809 * | 9/2000 | Angle ..................................... 166/66 |

\* cited by examiner

*Primary Examiner*—Frank Tsay
(74) *Attorney, Agent, or Firm*—Melvin A. Hunn

(57) ABSTRACT

A method is provided for generating an indicator of potential bit performance in a particular wellbore. Forensic wellbore data is obtained from at least one previously drilled wellbore which is determined to be comparable to the particular target wellbore. Typically, the comparable wellbore comprises an "offset" wellbore which is proximate the target wellbore, and which has similar geologic features. An inference engine computer program is provided which consists of executable program instructions. It is adapted to utilize a plurality of wellbore parameters, including the forensic wellbore data. The inference engine includes at least one rule matrix which defines a plurality of fuzzy sets. These fuzzy sets establish correspondence between the plurality of wellbore parameters and the indictor of potential bit performance. The inference engine computer program is loaded onto a data processing system. The forensic wellbore data and at least one other of the plurality of wellbore parameters is supplied as an input to the inference engine computer program. The data processing system is utilized to execute the program instructions of the inference engine computer program. This causes the application of the inputs to the inference engine computer program. The inference engine computer program produces as an output an indication of potential bit performance in the particular target wellbore.

80 Claims, 17 Drawing Sheets

|  | Bottom Hole Pressure | | |
|---|---|---|---|
| Gamma Ray | LP | MP | HP |
| NC | $NB_{(1,1)}$ | $NB_{(1,2)}$ | $LB_{(1,3)}$ |
| LC | $NB_{(2,1)}$ | $MB_{(2,2)}$ | $SB_{(2,3)}$ |
| MC | $LB_{(3,1)}$ | $SB_{(3,2)}$ | $SB_{(3,3)}$ |
| HC | $MB_{(4,1)}$ | $SB_{(4,2)}$ | $SB_{(4,3)}$ |

FIG. 4

TABLE 1
Balling Index Strategy

| Index Parameter | Potential Bit Balling Related Variables | Comments |
|---|---|---|
| | | Generally correlates with: |
| Gamma Ray, GR | Clay quantity | Gamma ray will provide, most of the time, the percentage of clay minerals present. |
| Bottom hole pressure, psi | Stress state | Stresses acting on the uncut shale and cuttings will depnd directly on the loading of the mud column. |
| | Strength | Formation and cutting strength will correlate directly to the pressure environment. |
| Not considered | Plasticity Index Water content | Both considered important but hopefully their omission will not be detrimental. |

TABLE 2

| depth from (feet) | depth to (feet) | mud weight (lb/gal) | pressure gradient (psi/ft) |
|---|---|---|---|
|  | 7198 | 9.2 | 0.478 |
| 7198 | 7214 | 12.0 | 0.623 |
| 7214 | 9373 | 12.3 | 0.639 |
| 9373 | 10498 | 13.9 | 0.722 |
| 10498 | 11135 | 14.4 | 0.748 |
| 11135 | 11285 | 14.6 | 0.758 |

METHOD AND APPARATUS FOR DETERMINING POTENTIAL FOR DRILL BIT PERFORMANCE

This application claims the benefit of U.S. Provisional Application Serial No. 60/121,346, filed Feb. 24, 1999, entitled Method and Apparatus for Determining Potential for Drill Bit Performance.

BACKGROUND OF THE INVENTION

1. Field of the Invention

The present invention relates in general to computer implemented processes for improving drilling operations, and in particular to a system and method for facilitating the selection and use of drill bits in order to minimize the occurrence of undesirable bit conditions such as undesirable bit balling.

2. Description of the Prior Art

Bit balling is an undesirable operating condition which impedes drilling operations. In general, drilling operations are performed in a manner which minimizes the possibility of the occurrence of bit balling. One factor which can be controlled is the selection of particular drill bits from a group of available drill bits. Certain bits may be less prone to bit balling under certain drilling conditions, while other bits are more prone to bit balling under certain drilling conditions.

SUMMARY OF THE INVENTION

It is one objective of the present invention to provide a new system, method, and apparatus for providing an indicator of potential bit performance in a particular wellbore, which utilizes an inference engine computer program which consists of executable instructions, and which is adapted to utilize a plurality of wellbore parameters as inputs, including forensic wellbore data from an offset or comparable wellbore, and which includes at least one rule matrix which defines a plurality of fuzzy sets which establish correspondence between the plurality of wellbore parameters and the indicator of potential bit performance.

It is another objective of the present invention to provide such an indicator of potential bit performance which provides an indication of the potential for undesirable bit balling.

It is another objective of the present invention to provide an indicator which may be utilized in selecting particular drill bits for use in a particular wellbore.

The foregoing and additional objectives are achieved as follows. A method is provided for generating an indicator of potential bit performance in a particular wellbore. Forensic wellbore data is obtained from at least one previously drilled wellbore which is determined to be comparable to the particular target wellbore. Typically, the comparable wellbore comprises an "offset" wellbore which is proximate to the target wellbore, and which has similar geologic features. An inference engine computer program is provided which consists of executable program instructions. It is adapted to utilize a plurality of wellbore parameters, but at a minimum it utilizes the forensic wellbore data. The inference engine includes at least one rule matrix which defines a plurality of fuzzy sets. These fuzzy sets establish correspondence between wellbore parameters and the indictor of potential bit performance. The inference engine computer program is loaded onto a data processing system. At least the forensic wellbore data is supplied as an input to the inference engine computer program. The data processing system is utilized to execute the program instructions of the inference engine computer program. This causes the application of the inputs to the inference engine computer program. The inference engine computer program produces as an output an indication of potential bit performance in the particular target wellbore.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 4 is a tabular representation of a rule matrix.

Table 1 is a tabular representation of the balling index strategy in accordance with the present invention.

Table 2 is a tabular representation of bottomhole pressure gradient for one test well.

DETAILED DESCRIPTION OF THE INVENTION

Overview of Drilling Operations

Figure 1:
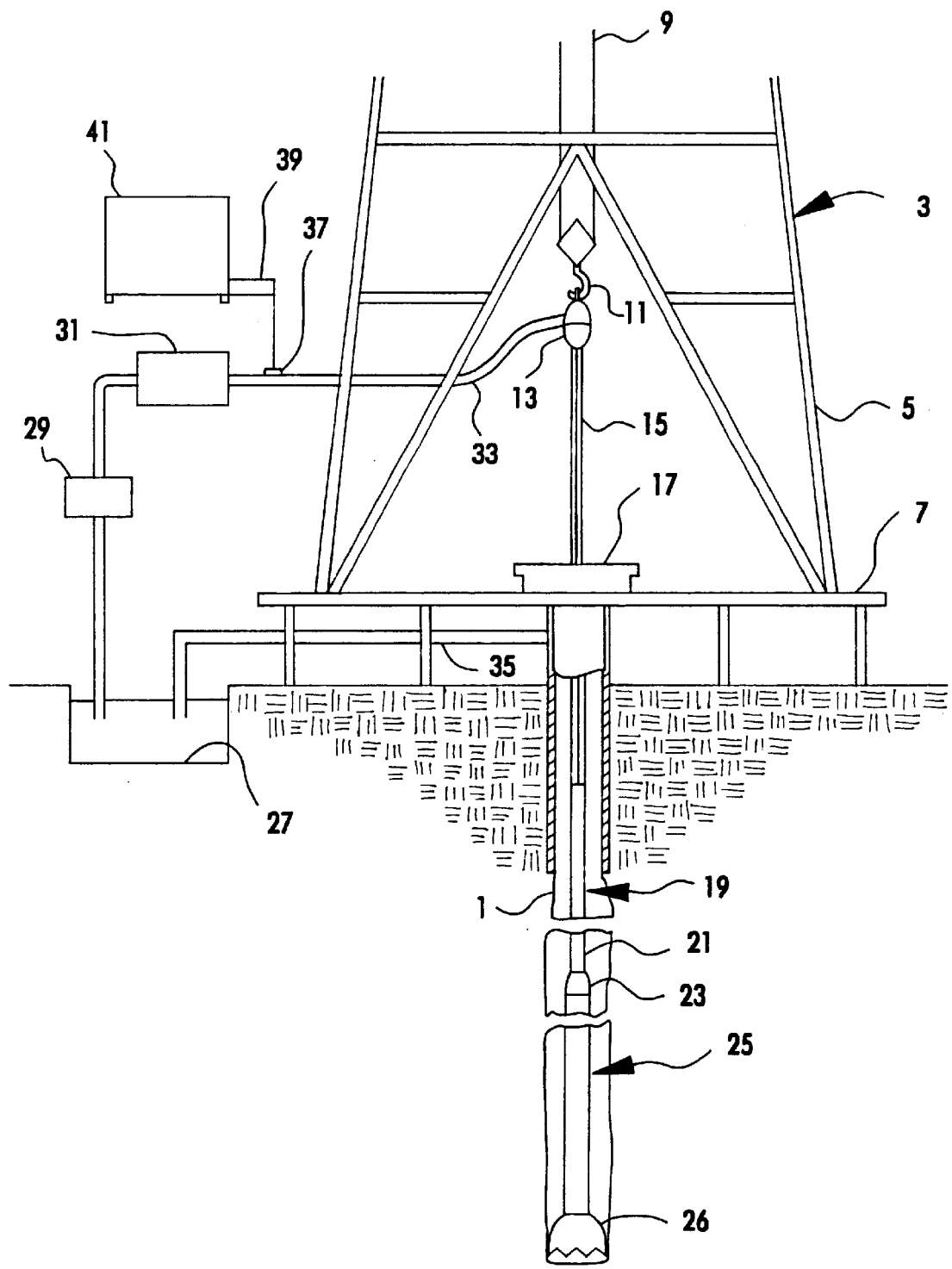
FIG. 1 is a simplified pictorial representation of drilling operations which may be conducted in accordance with the present invention.

FIG. 1 depicts one example of drilling operations conducted in accordance with the present invention with a downhole drill bit selected in accordance with the present invention based upon its suitability for the drilling conditions based at least in part upon its compatibility to a projected or anticipated potential for balling as determined by a bit balling index.

As is shown, a conventional rig 3 includes a derrick 5, derrick floor 7, draw works 9, hook 11, swivel 13, kelly joint 15, and rotary table 17. A drillstring 19 which includes drill pipe section 21 and drill collar section 23 extends downward from rig 3 into wellbore 1. Drill collar section 23 preferably includes a number of tubular drill collar members which connect together, including a measurement-while-drilling logging subassembly and cooperating mud pulse telemetry data transmission subassembly, which are collectively referred to hereinafter as "measurement and communication system 25".

During drilling operations, drilling fluid is circulated from mud pit 27 through mud pump 29, through a desurger 31, and through mud supply line 33 into swivel 13. The drilling mud flows through the kelly joint and an axial central bore in the drillstring. Eventually, it exits through jets which are located in downhole drill bit 26 which is connected to the lowermost portion of measurement and communication system 25. The drilling mud flows back up through the annular space between the outer surface of the drillstring and the inner surface of wellbore 1, to be circulated to the surface where it is returned to mud pit 27 through mud return line 35. A shaker screen (which is not shown) separates formation cuttings from the drilling mud before it returns to mud pit 27.

Preferably, measurement and communication system 25 utilizes a mud pulse telemetry technique to communicate data from a downhole location to the surface while drilling operations take place. To receive data at the surface, transducer 37 is provided in communication with mud supply line 33. This transducer generates electrical signals in response to drilling mud pressure variations. These electrical signals are transmitted by a surface conductor 39 to a surface electronic processing system 41, which is preferably a data processing system with a central processing unit for executing program instructions, and for responding to user commands entered through either a keyboard or a graphical pointing device.

The mud pulse telemetry system is provided for communicating data to the surface concerning numerous downhole conditions sensed by well logging transducers or measurement systems that are ordinarily located within measurement and communication system 25. Mud pulses that define the data propagated to the surface are produced by equipment which is located within measurement and communication system 25. Such equipment typically comprises a pressure pulse generator operating under control of electronics contained in an instrument housing to allow drilling mud to vent through an orifice extending through the drill collar wall. Each time the pressure pulse generator causes such venting, a negative pressure pulse is transmitted to be received by surface transducer 37. An alternative conventional arrangement generates and transmits positive pressure pulses. As is conventional, the circulating mud provides a source of energy for a turbine-driven generator subassembly which is located within measurement and communication system 25. The turbine-driven generator generates electrical power for the pressure pulse generator and for various circuits including those circuits which form the operational components of the measurement-while-drilling tools. As an alternative or supplemental source of electrical power, batteries may be provided, particularly as a back-up for the turbine-driven generator.

Figure 2:
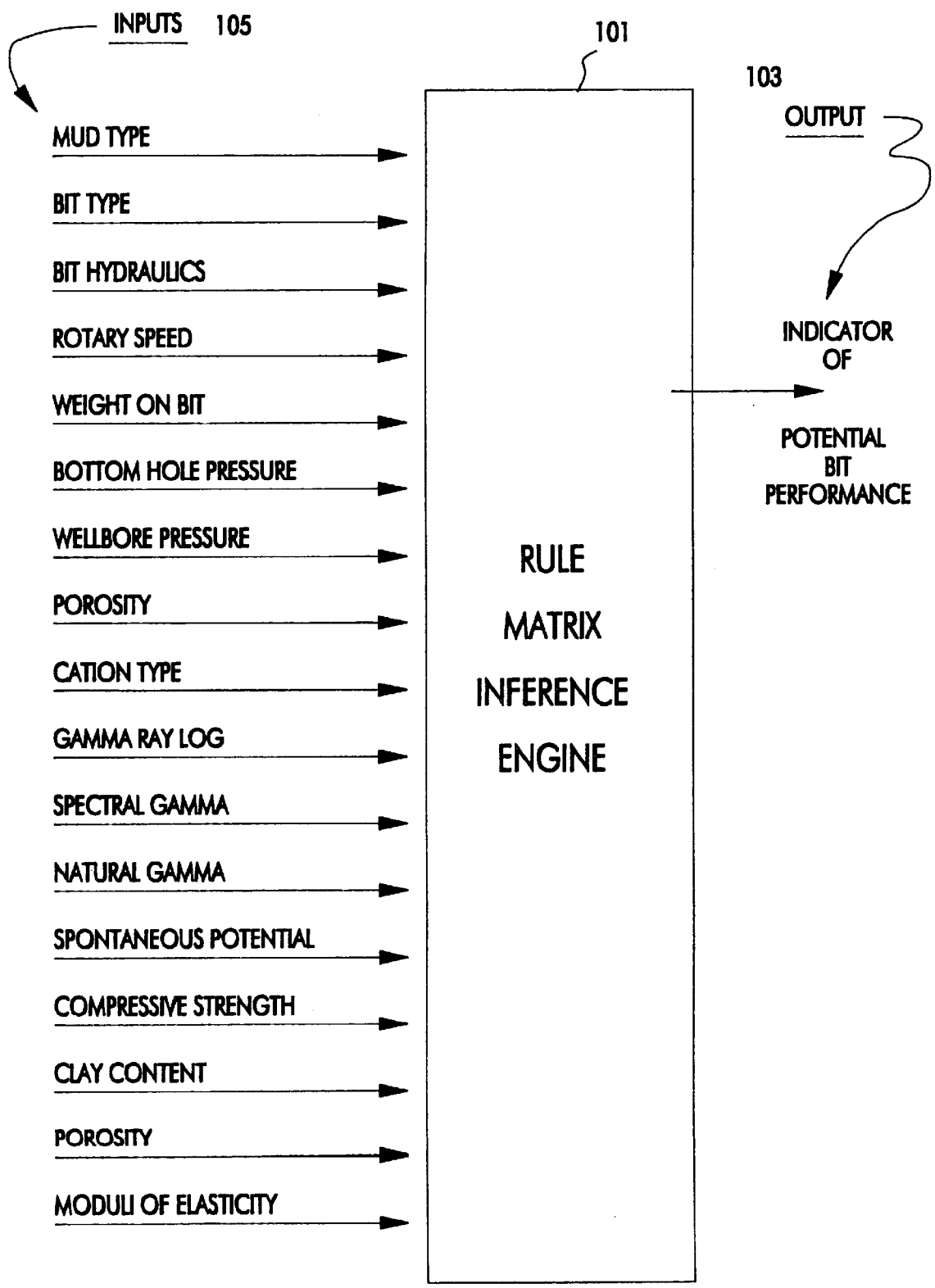
FIG. 2 is a block diagram representation of the types of wellbore parameters which may be utilized in accordance with the preferred and alternative embodiments of the present invention.

FIG. 2 is a block diagram pictorial representation of the broad concept of the present invention. As is shown, a rule matrix inference engine 101 produces as an output 103 an indicator of potential bit performance. A number of inputs 105 may be provided to the rule matrix inference engine 101. FIG. 2 depicts exemplary types of input data including mud type, bit type, bit hydraulics, rotary speed, weight on bit, bottomhole pressure, wellbore pressure, porosity, cation type, gamma ray log data, spectral gamma ray log data, spontaneous potential, compressive strength, clay content, and moduli of elasticity. In the preferred embodiment of the present invention, forensic gamma ray log data from offset wells is provided as one input. These wells are located proximate the target well, and likely traverse geologic formations at particular depths. The target well is expected to traverse the same types of formations at generally the same types of depths. Therefore, the offset wells provide a good indication of the lithology that is going to be drilled in the target well. In accordance with the preferred embodiment of the present invention, the projected bottomhole pressure—as a function of depth of the target well is also provided as an input to the rule matrix inference engine 101. The rule matrix inference engine 101 receives these two types of input, one being forensic log data and the other being projected bottomhole pressure, and produces a numerical indicator of potential bit performance. In particular, it produces an indicator of potential bit balling. In the preferred embodiment of the present invention, this data is used in the planning stages of the target wellbore in order to select the types of bits which are more suitable for particular drilling conditions which have a greater potential for bit balling. In other words, the rule matrix inference engine 101 is utilized in well planning operations in order to select particular bits which might perform better under projected conditions.

The rule matrix inference engine 101 of FIG. 2 is preferably constructed utilizing executable program instructions. Preferably, the program instructions are executed by a general purpose data processing system, such as that depicted in FIG. 3.

Figure 3:
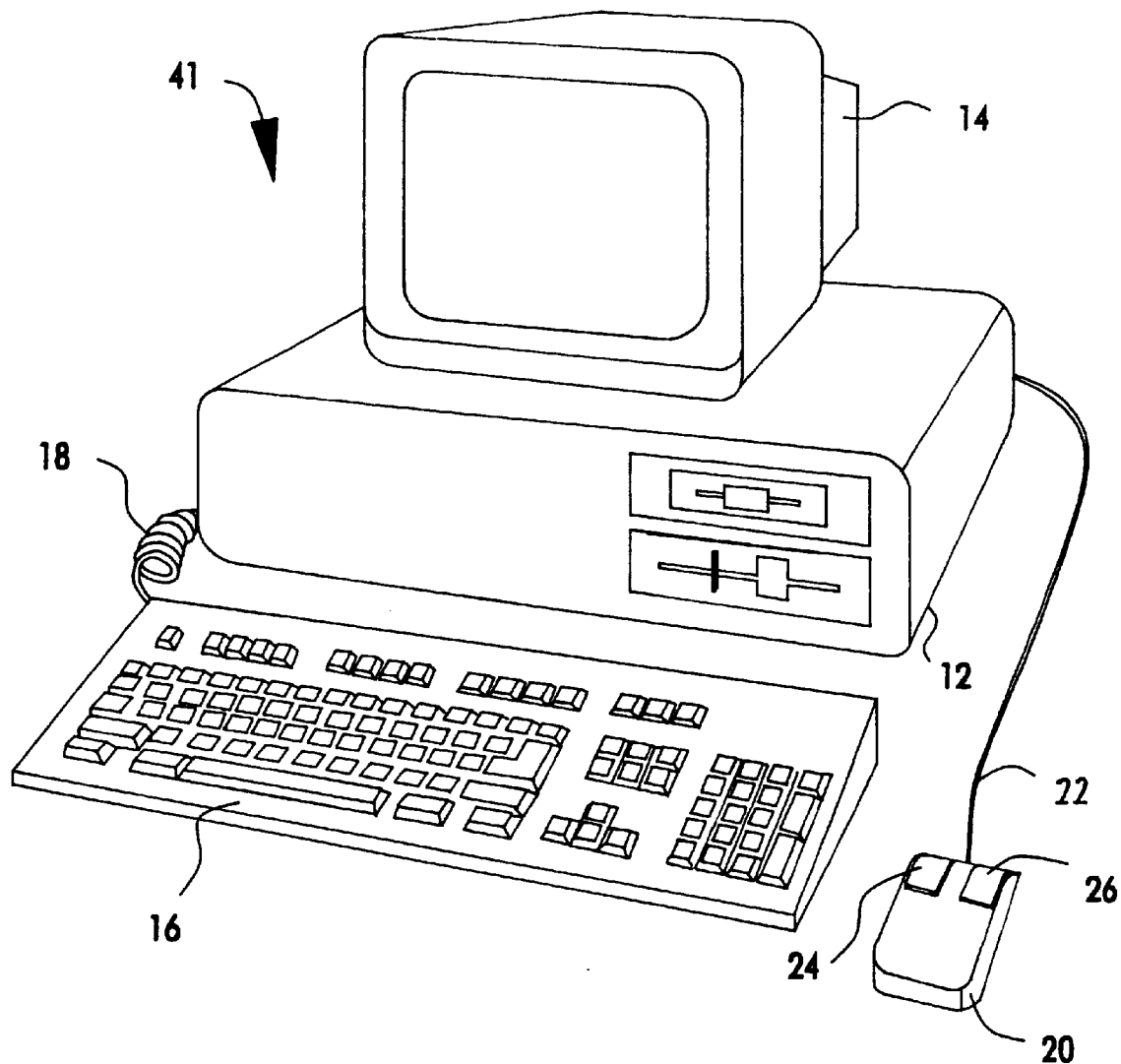
FIG. 3 is a pictorial representation of a data processing system.

With reference now to the figures and in particular with reference to FIG. 3, there is depicted a pictorial representation of data processing system 41 which may be programmed in accordance with the present invention. As may be seen, data processing system 41 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 41. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 41 may be implemented utilizing a so-called personal computer.

In accordance with the preferred embodiment of the present invention, the rule matrix inference engine 101 (of FIG. 2) is constructed of executable instructions which are executed by a data processing system 41. What follows is a discussion of bit balling, the balling index which is generated in accordance with the present invention, a discussion of the variables believed to affect bit balling, a description of the rule matrix, a description of fuzzy set methodology, a discussion of application of the balling index to two test wells, and a discussion of the contents of the computer implemented rule matrix inference engine 101 of FIG. 2.

Balling

Drilling progress in shale formations is often impeded by bit balling. Rock debris accumulates on the cutting structure and body of the bit during the drilling process. The condition worsens with continued drilling until flow passages are clogged and the cutting structure packs off. Rate of penetration is slowed to below acceptable levels and continued progress only occurs as the accumulated ball of rock debris is plastically extruded past cutting structure, and bit body.

Drilling shale at depths deeper than 10,000 ft. and with mud weights above 12 lbm/gal in water based mud will almost guarantee bit balling problems. Any soft porous rock will agglomerate on the bit, but shale formations are the most problematic. Their sensitivity to water based drilling fluids seems to be the root cause although not all the mechanisms are understood in detail. High down hole pressure associated with deep drilling and high mud weights are also an aggravating factor.

Because bit balling can have such a dramatic affect on the over all drilling economics it is important to recognize situations ahead of time where it might be a problem. For this reason it would be ideal to estimate balling potential from wire line log data available from offset wells.

Balling Index

One goal of the present invention is to provide an index that ranges from 0 to 1 and that corresponds to the balling potential of a given formation. This index was to be derived from wire line log data that is readily available.

A balling index of '0' would correspond to absolutely no balling potential and '1' to an almost certain balling potential. Values above '0.5' would be deemed to be problematic. Further, the underlying algorithms should depend on the minimum number of formation parameters (independent variables) while still maintaining the ability to predict balling potential. Simplicity in this respect makes it easier to understand cause and effect relationships and facilitates adjusting the algorithm to field experience.

There are many factors that contribute to the propensity of a bit to ball that fall outside the consideration of this balling index. Many of these are not available as wire line data or may not be known before the well is drilled. Examples might be mud type, bit hydraulics, operating parameters such as rotary speed, and weight, and bit design. For this reason the index calculated in accordance with the present invention represents a balling potential or danger presented by the specific formations that must be drilled and the approximate stress state under which they must be drilled. In the preferred embodiment, it specifically does not consider the affects of parameters that are not represented in wire line log data or are not generally known before the well is drilled, but in alternative embodiments such parameters (as shown in FIG. 2) may be considered.

Variables Believed to Affect Bit Balling

Problems with bit balling center for the most part around shale drilling. Shale is encountered in approximately 75% of the drilling done for oil and gas (Steiger and Leung, 1992) and can be among the most difficult formations to drill.

Shale is defined as a fine-grained detrital sedimentary rock formed by the consolidation of clay, silt, or mud and characterized by their finally laminated structure (Bates and Jackson, 1987). Further properties include low permeability and high sensitivity to water. Because transport mechanisms are slow and their structure is water sensitive mechanical and physical properties change with exposure to fluids. Most problems become worse the longer the shale is exposed.

Gault et al., 1988 identified the type and quantity of clay in the shale as an important variable determining drillability. Specifically, he identified Cation Exchange Capacity, CEC potential as measured by methyl blue absorption testing. Young smectite clays found in 'Gumbo' shale which are highly water sensitive, score high and signal bit balling. Until the introduction of aggressive PDC drill bits, and improved hydraulics, bit balling and unacceptability slow drilling occurred often in these environments.

Drilling below 10,000 feet with dense drilling muds (generally higher than 12 lbm/gallon mud) presented new problems due to high hydrostatic mud pressures. Here, too unacceptable penetration rates were observed, however, in the beginning it was not clear that the problem was bit balling. Knowlton, 1990 spoke of 'plastic shale' and posited the notion that the rock was deforming in a plastic wave ahead of the bit—not allowing the bit to bite into the rock. This plastic rock behavior was believed to be caused by the bottom hole pressure occurring at 10,000 feet with weighted mud. To add to the confusion was the fact that the bits were never pulled from these depths in a balled condition.

Recent laboratory and drilling simulator experimental work done by Bland, Isbell and Pessier (HCC confidential), 1998; Van Oort, 1997; and Smith, 1998 confirm the problem is indeed bit balling and that the clogged bits most probably leave the balled agglomeration on the hole bottom or loose it during the trip out of the hole.

Finally, the work of Smith suggests that the deep shale drilling problems may be associated with older illitic clay types. Shale that have this type of clay, for example Catoosa shale, tend to form stronger agglomerations that are less easily extruded around the bit body. Remolded strength, therefore, becomes an important variable to consider for bit balling.

It is important to emphasize that the primary goal of the preferred embodiment of the present invention is to calculate an index from wire line log data and to keep the number of parameters to a minimum. Our first try at calculating a balling index is to reduce our considerations to two parameters: (1) Gamma Ray ("GR") as a measure of the quantity of clay present, and (2) bottom hole pressure to quantify the stress state and formation strength under which the drilling will take place. For a simple index it was felt that these two parameters would capture the majority of difficult situations. As experience is gained, additional parameters could be added to the model.

Clay type is somewhat reflected in the bottom hole pressure parameter since shale that is deep is often the stronger illite. Plasticity index and water content are difficult to intuit from log data and have not been considered. It is hoped that their influence is secondary in nature and will not dramatically influence the accuracy of the balling index. In summary, as set forth in Table 1 illustrates our strategy.

Describing the Rule Matrix

There is no 'right and only' method for constructing or calculating the balling index. The goal is to provide a warning if their is a potential of balling and the basis for calculating that warning or index is solely based on past experience. The calculation should be readily modifiable if new or different experience is gained in the future.

For simplicity the two parameters discussed above were decided on: Gamma Ray and Bottom Hole Pressure. These will be combined using a simple rule matrix as shown in FIG. 4. For example when the clay content is judged to be 'MC' (medium clay) and the bottom hole pressure is judged to be 'LP' (low pressure) the balling potential is determined as 'LB' (low balling).

A rule matrix such as this makes it convenient to modify and improve the accuracy of our rules as we gain experience. The rule set is expressed in terms of linguistic variables such as 'no', 'light', 'medium' and 'high' clay, and 'low', 'medium', and 'high' pressure. It is necessary to assign a numeric range of values to each category in the domain. For example 'no clay' might have the Gamma Ray values 0 to X assigned to it, medium clay X to Z and so on. Once a balling tendency has been identified such as 'low balling' a numeric value between 0 and 1 needs to be assigned. The value we choose is up to us, for this example say 0.33.

Figure 5:
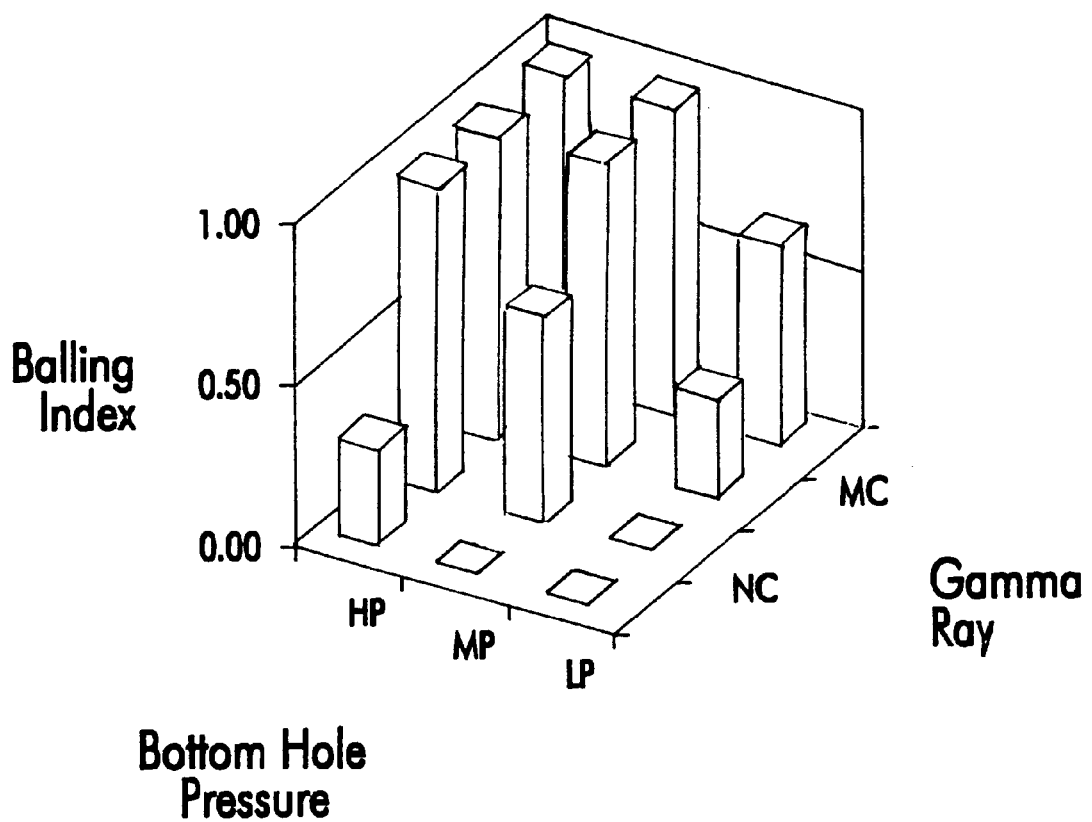
FIG. 5 is a three dimensional graphical representation of a response surface which maps a balling index to bottomhole pressure and gamma ray measurements.

If this is done discrete values for the balling index result as shown in FIG. 5. This plot can be thought of as a response surface. As can be seen from FIG. 5 the method described above provides a 'jumpy' surface and only four discrete values of balling index. Using the methods of fuzzy sets, however, makes it possible to smooth the response surface and calculate continuous values of balling index from 0 to 1.

Fuzzy Set Methods

Figure 6:
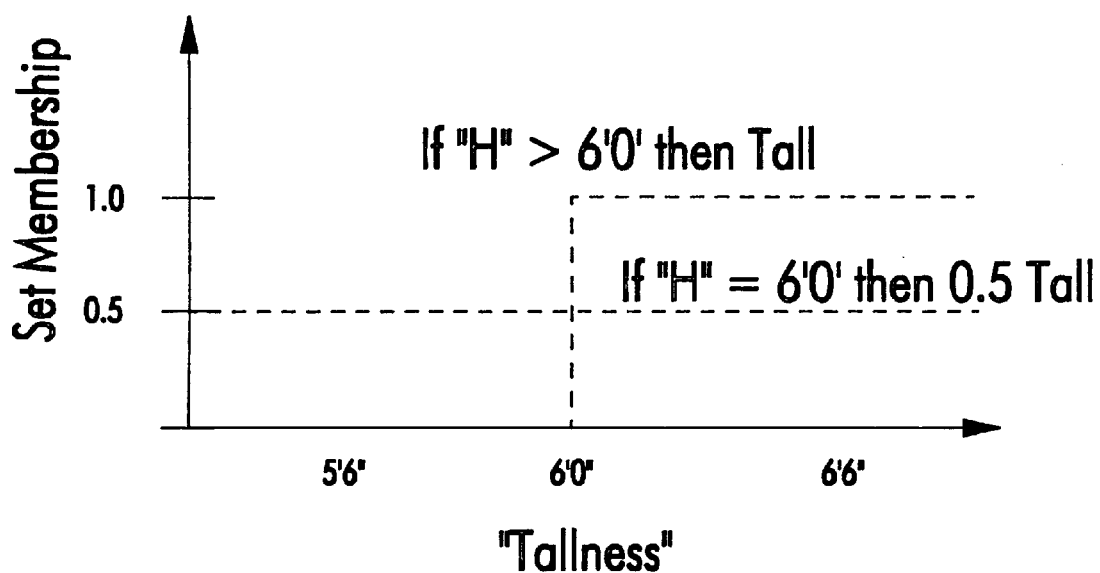
FIG. 6 is a graphical representation of a membership function for a fuzzy set.

Fuzzy methods can be described using FIG. 6. In this example, tallness set membership is plotted versus height. One might ask: "when is a person considered tall?". A crisp answer might be stated as, "if height equal to or greater than 6'0" then tall". What if a person is 5'11"? Is he then short? The all or nothing aspect of crisp values is in,this case unsatisfactory.

Using fuzzy set theory the following statement would be made, "if height equal to 6'0" then 0.5 tall". The person belongs 50% to the tallness set and presumably 50% to the shortness set. A person 6'3" tall would belong approximately 75% to the tallness set and so forth.

Figure 7:
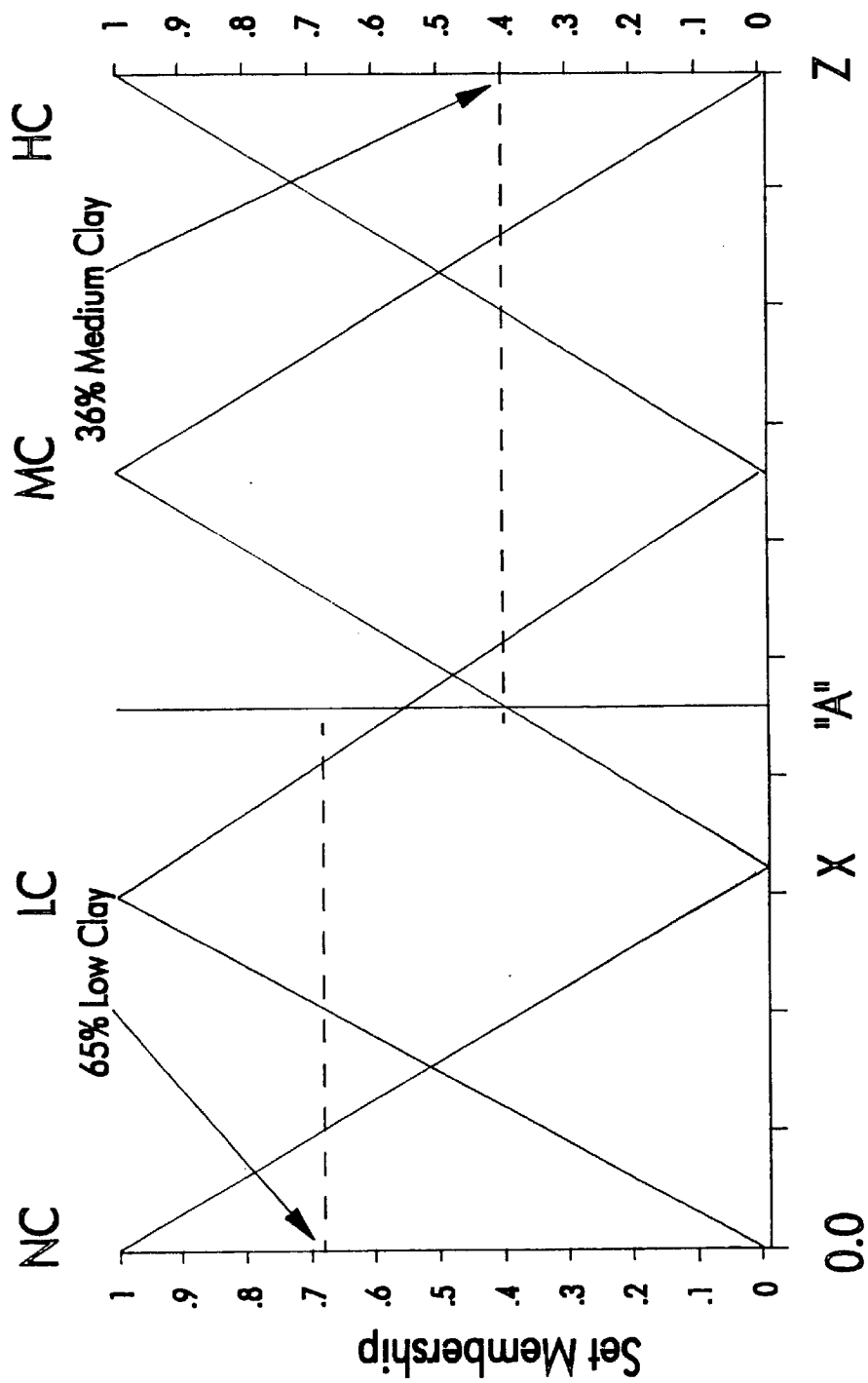
FIG. 7 is a graphical representation of membership functions for gamma ray measurements.
Figure 8:
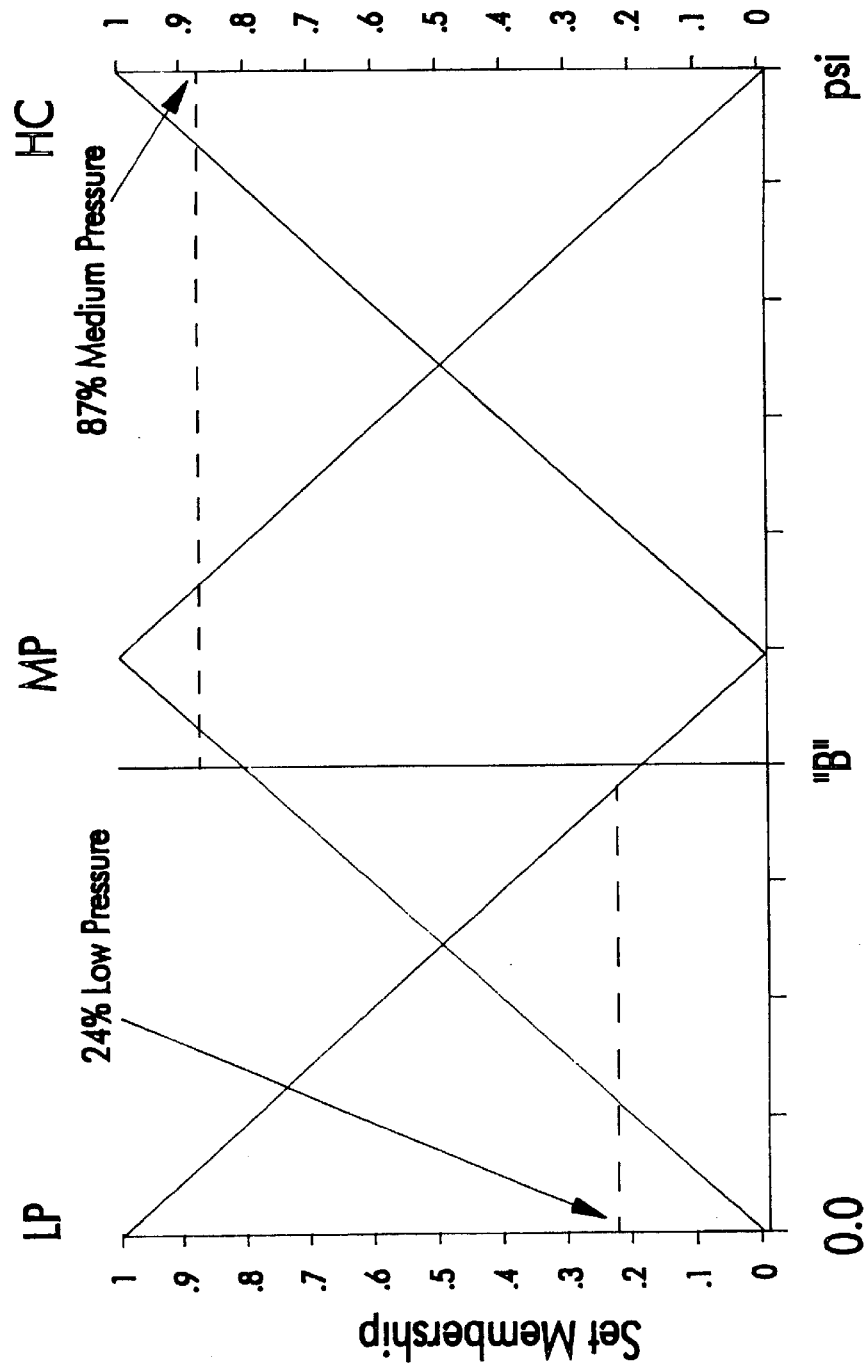
FIG. 8 is a graphical representation of a membership function for bottomhole pressure.

FIGS. 7 and 8 depict the fuzzy sets that have been constructed for Gamma Ray and Bottom Hole Pressure and make possible the transformation of a crisp value taken from a log into the linguistic variables described above. For example, let us assume we have a Gamma Ray reading of "A" and a Bottom Hole Pressure of "B" psi. From FIG. 8 it can be seen that the Gamma Ray measurement belongs about 35% to the medium clay, 'MC' set and about 65% to the low clay, 'LC' set. Similar considerations for Bottom Hole Pressure would show 24% membership to the low pressure, 'LP' set and about 87% membership to the 'MP' set.

Figure 9:
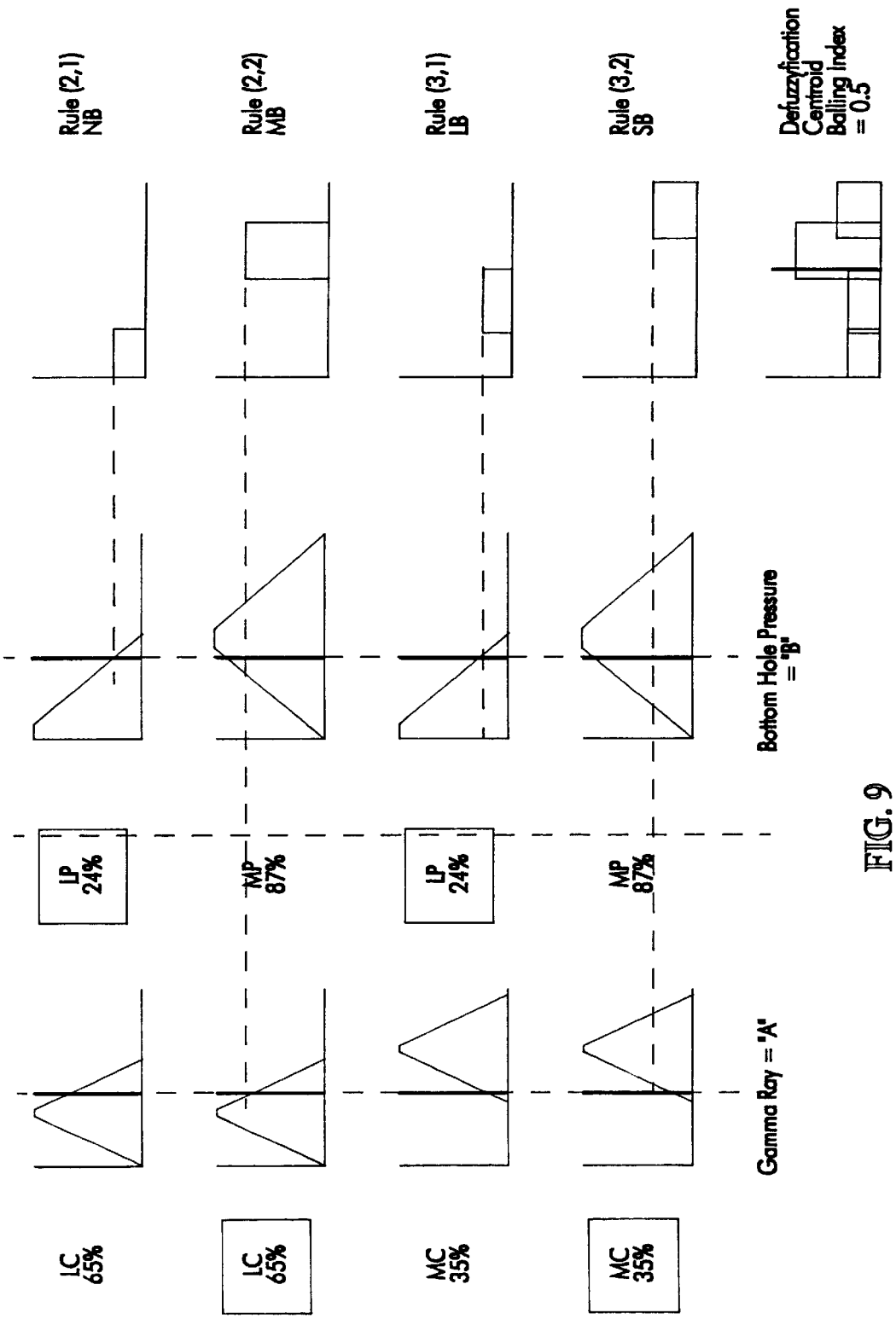
FIG. 9 is a graphical representation of the fuzzy set methodology in accordance with the present invention.

Each combination of Bottom Hole Pressure and Gamma Ray sets forms an input pair. In our example, as seen from FIG. 9 four pairs of values are possible. These four pairs fire the four corresponding rules in the rule matrix as illustrated in FIGS. 4 and 9. For our example rules; 2,1 (no balling); 2,2 (medium balling); 3,1 (low balling); and 3,2 (severe balling) are all fired.

Not all the rules, however, are fired with the same intensity. The degree of firing depends on the minimum set membership value of each pair. For example, the firing of rule 3,2 is the result of the pair MC:35%, and MP:87% Because MC is the minimum of the two it governs and the rule is fired at 35%.

Figure 10:
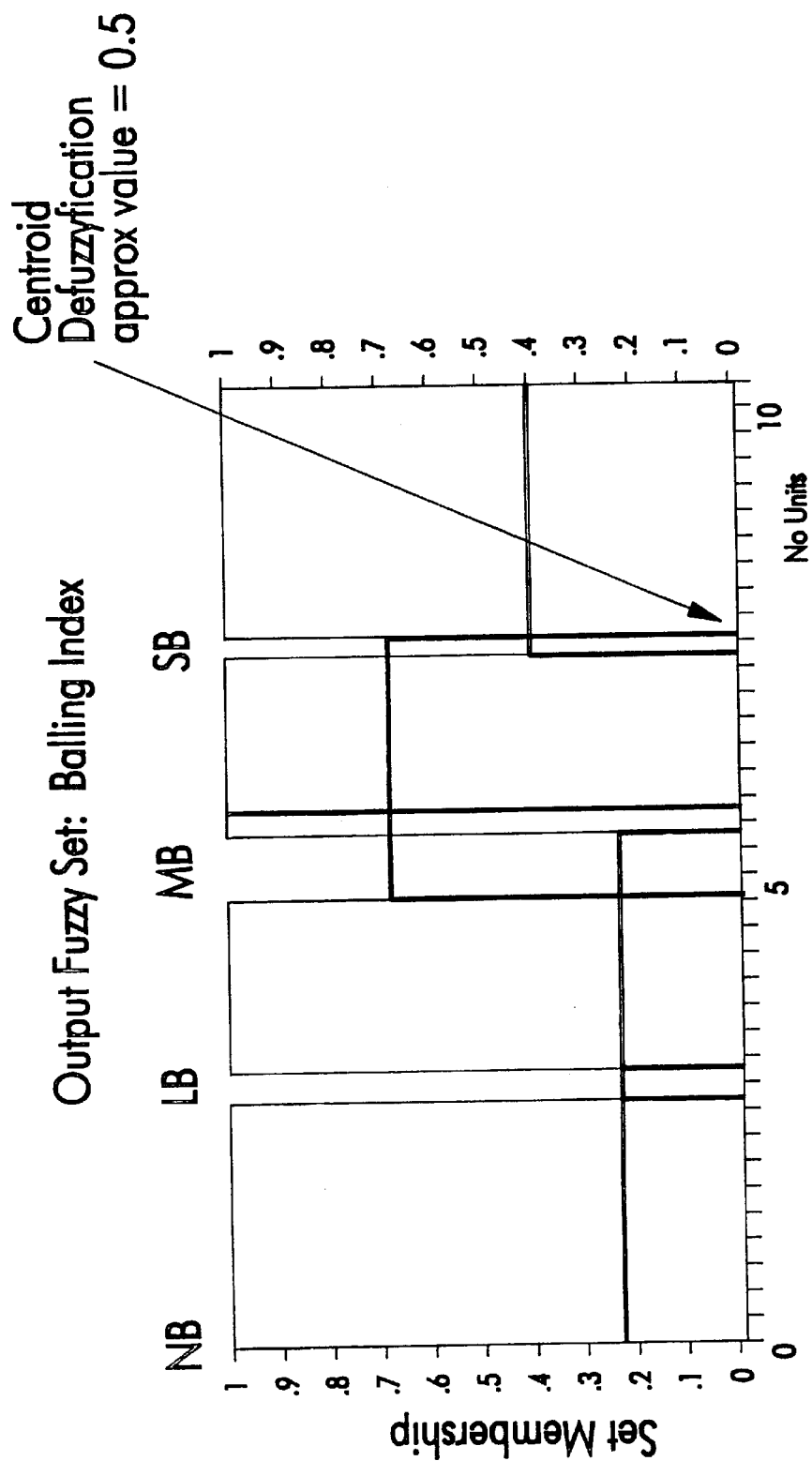
FIG. 10 is a graphical representation of the output of the balling index in accordance with the preferred embodiment of the present invention.

Defuzzifying the four minima is accomplished with an output fuzzy set that for our example is shown in FIG. 10. There is a bar or set for each severity of balling; 'NB', no balling, 'LB', low balling, 'MB', medium balling, and 'SB', severe balling. The height of each bar ranges from '0' to '1' and is determined by the values of the four minima. This is illustrated in FIG. 10. These sets are then geometrically combined and the centroid of the resulting geometric area calculated. The value of this centroid represents the defuzzified balling index of 0.5 as shown in FIG. 10.

Figure 11:
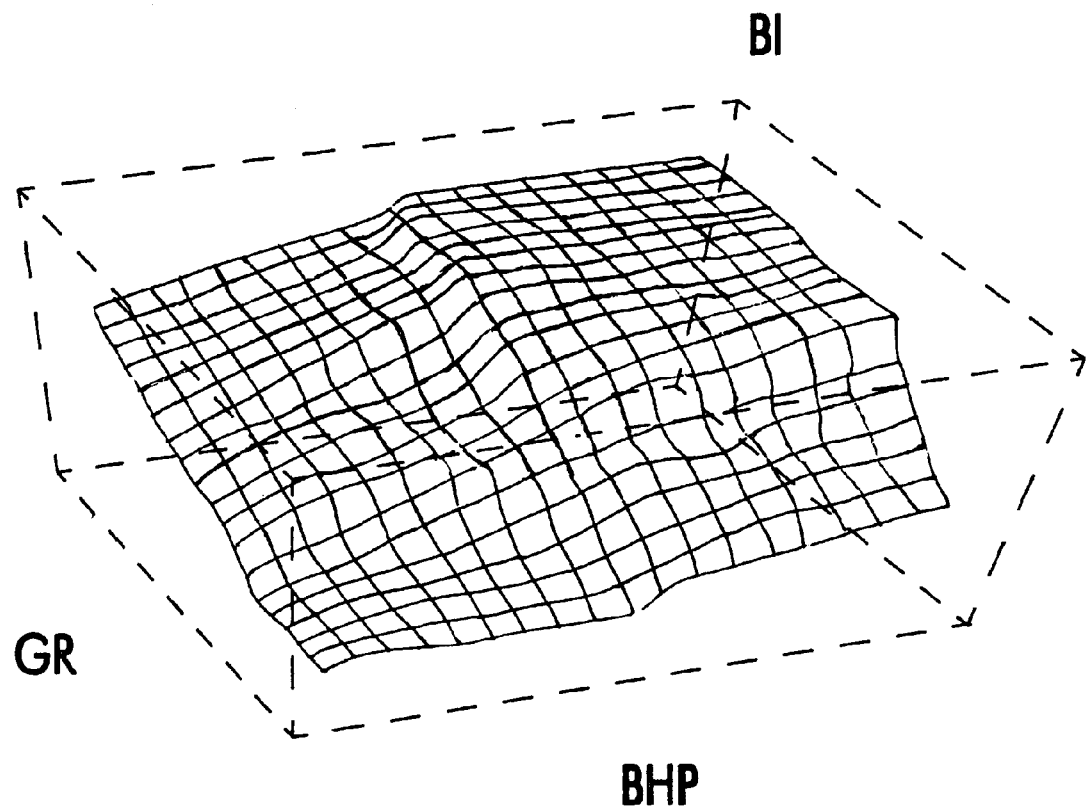
FIG. 11 is a three dimensional representation of the response surface in accordance with the preferred embodiment of the present invention.

Calculating the balling index using the above rule set and the fuzzy set methods for all combinations of Bottom Hole Pressure and Gamma Ray results in the response surface that is illustrated in FIG. 11. As is readily apparent the surface is smooth and 'well behaved'. It is also clear which combinations of Bottom Hole Pressure and Gamma Ray values are most problematic for bit balling.

If experience should show that the balling index is not accurate, modification is done simply by changing the rule matrix to more closely agree with the new experience. Of course the assumption, here, is that Bottom Hole Pressure and Gamma Ray are the most influential parameters that describe balling potential. If another variable is found to be more or as important it could either replace one of the above or be added into the scheme by using additional rule matrices. Care must be taken, however, since each new variable dramatically increases the number of rules that must be calibrated.

Applying the Balling Index to Two Wells

Baker Hughes Incorporated operates an experimental drilling facility in Beggs, Okla. about 30 miles southwest of Tulsa. The formations have been extensively logged and drilled to about 3200 feet vertical depth. There are usually no severe balling problems through these shallow intervals, however, there are shale formations that can be problematic if bit hydraulics are not sufficient. Two of note are the Fayetteville at 2260' and the Woodford at 2630'.

Figure 12:
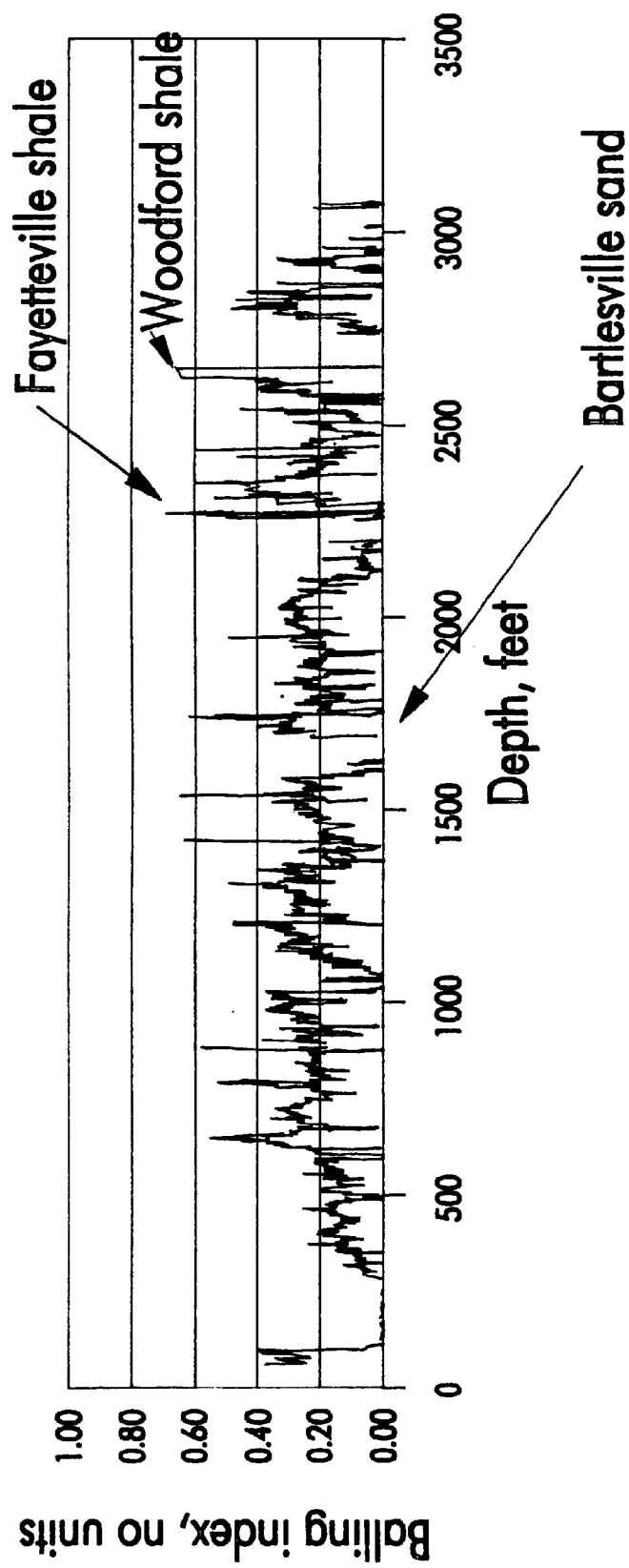
FIG. 12 is a graphical representation of the field results from one test well.

We used the Gamma Ray, GR log and depth information to perform a foot by foot calculation of the above described balling index. The results are shown in FIG. 12. Because the well is so shallow the response is governed entirely by the Gamma Ray value. Most values are about 0.3 with occasionally spikes of short duration. The curve dips to zero corresponding to the major sand, limestone and dolomite formations, for example the Bartlesville sand at 1590'. The Fayetteville shale at 2260' and Woodford shale at 2630' are also noted.

Off Shore Gulf of Mexico

The section was drilled with a 9½ diameter PDC bit starting at approximately 4000' and continuing to approximately 11,500'. The drilling fluid was a salt water weighted mud. Mud weights were adjusted according to Table 2.

Figure 13:
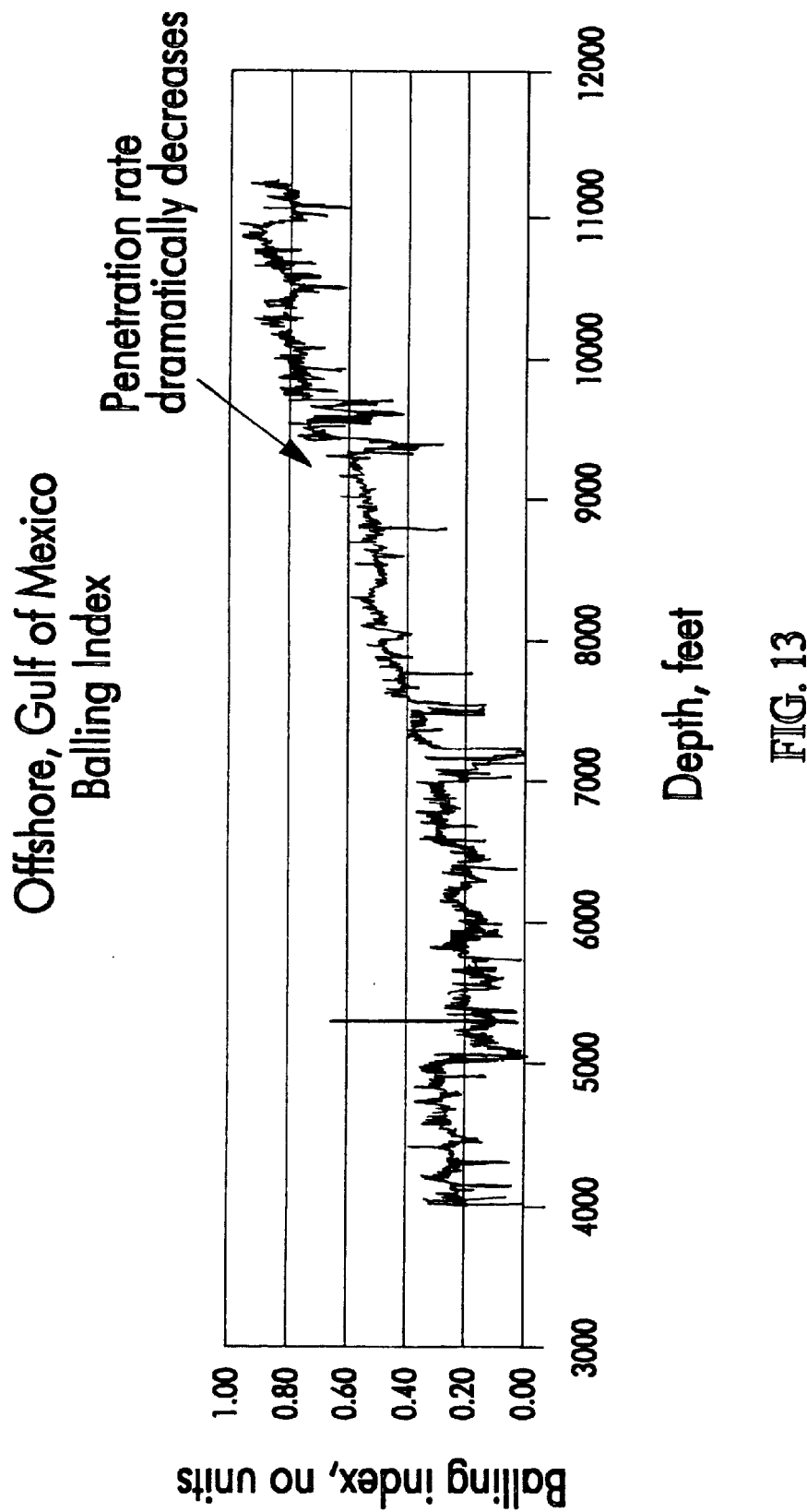
FIG. 13 is a graphical representation of test results from a second test well.

The calculated balling index is shown in FIG. 13. In this case both the Bottom Hole Pressure and Gamma Ray parameters play a role in the calculated balling index. According to the calculation transition to the 0.5 value and to problematic drilling is reached somewhere between 8000 and 9000 feet. This is agrees with the statements of the drilling engineer who reported significant penetration rate reductions starting at about 9000 feet.

Summary

A balling index has been constructed that possess the desired behavior for a limited number of wells tested.

Namely, problematic behavior starts at a value of approximately 0.5. Values below this indicate drilling relative free of balling and values above this signal potential balling problems. This index is constructed from wire line log data and other data that are readily available. It is currently a simple index, relying on just two parameters, GR and BHP. Using rule matrices and the methods of fuzzy sets make the index easy to adjust to new field experience and well behaved in terms of a smooth response surface. It is fully expected that the particular rule matrix derived to date will be modified and expanded in the future to include the best possible field experience.

Figure 14:
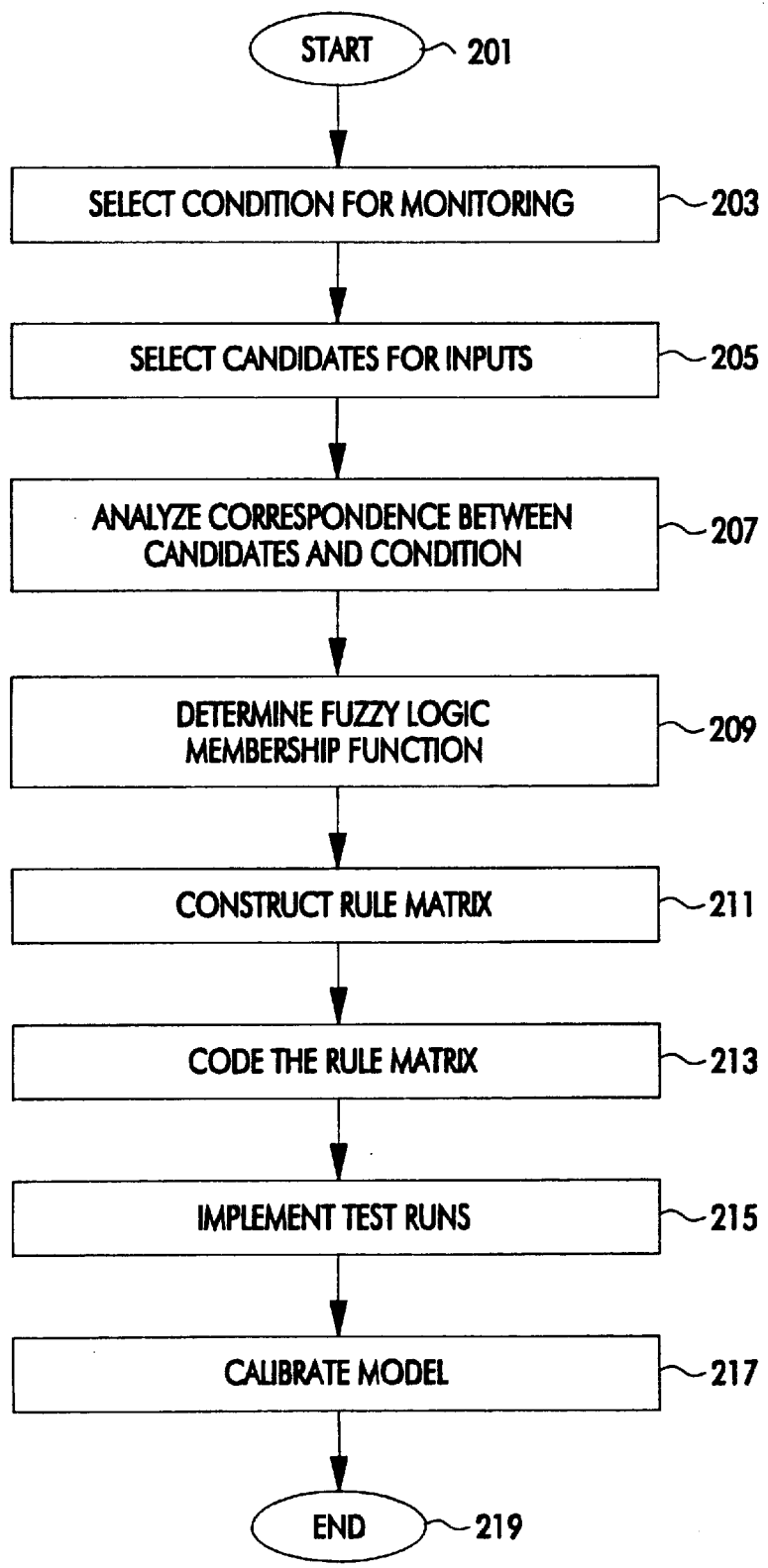
FIG. 14 is a flowchart representation of the broad steps of implementing the present invention.

FIG. 14 is a flowchart representation of the broad method of implementing the present invention. The process starts at block 201, and continues at block 203, wherein certain conditions are selected for monitoring. In the preferred embodiment of the present invention, it is a bit balling condition that is selected for monitoring. Next, in accordance with block 205, candidates are selected as inputs for a model. In accordance with the present invention, the inputs which have been selected include the gamma ray measurements of an offset well and likely or calculated bottomhole pressure of the target well. In accordance with step 207, the correspondence between the candidate inputs and the condition that is going to be monitored is analyzed. In accordance with step 209, fuzzy logic membership functions are determined for the components. In accordance with block 211, a rule matrix is constructed. Then, in accordance with block 213, the rule matrix is coded. In other words, it is implemented utilizing data processing instructions. In accordance with step 215, test runs are implemented in order to generate data. In accordance with block 217, the data from the test runs is utilized to calibrate the model. The process ends at block 219.

Figure 15:
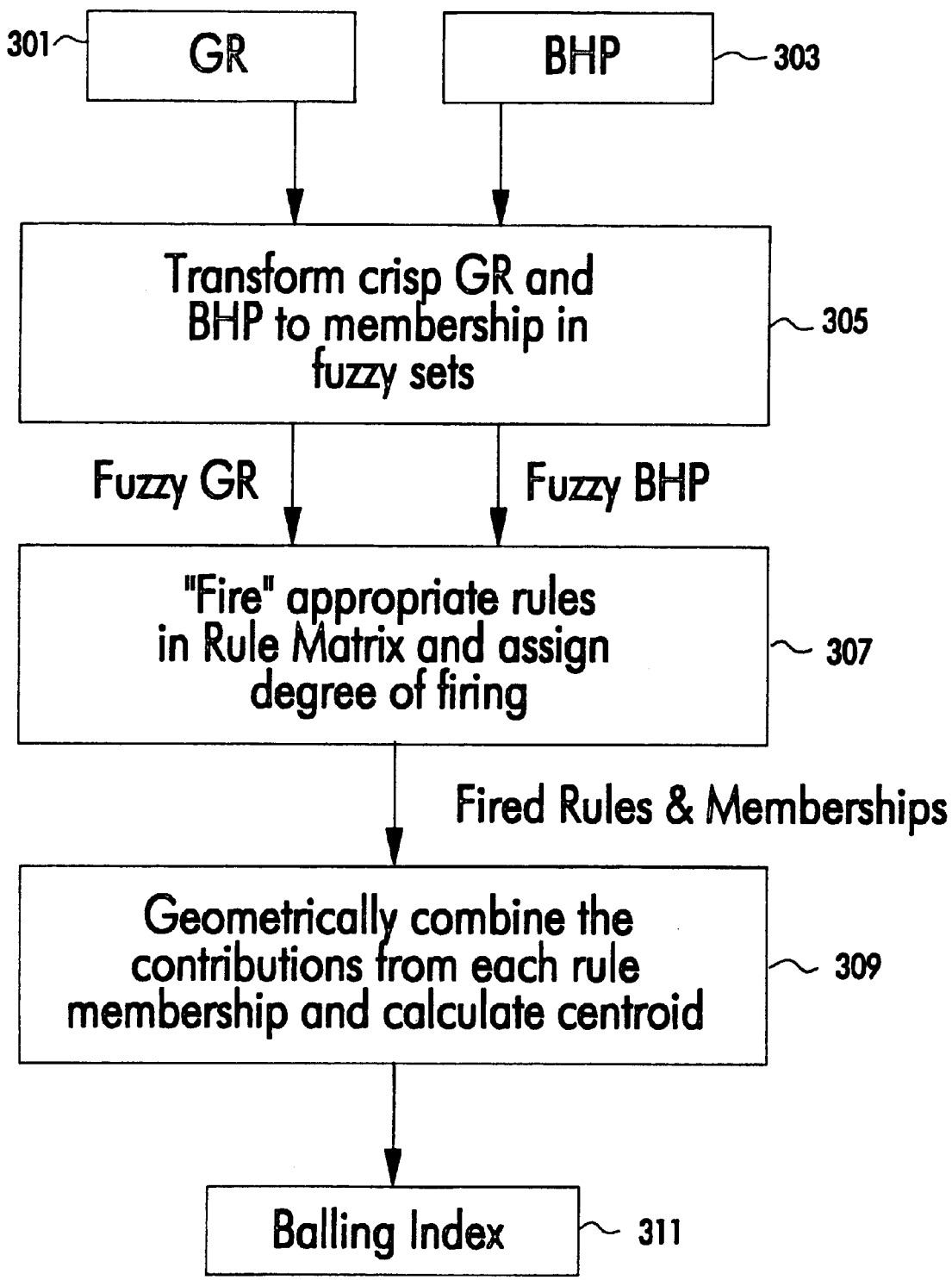
FIG. 15 is a flowchart representation of the preferred embodiment of the executable instructions.

FIG. 15 is a flowchart representation of the preferred implementation of the computer program of the present invention which is utilized to generate a balling index. Inputs 301, 303, are provided to the computer program. Input 301 represents the gamma ray information in American Petroleum Institute units. Input 303 represents bottomhole pressure in pounds per square inch. These are provided to block 305 which transforms the crisp gamma ray and bottomhole pressure information to membership in fuzzy sets. The fuzzy gamma ray information and fuzzy bottomhole pressure information is provided as an input to module 307, which fires the appropriate rules in the rule matrix and assigns the degree of firing. The fired rules and their memberships are supplied as an input to block 309 which geometrically combines the contributions from each rule membership and calculates a centroid. Next, control passes to block 311, wherein the balling index is generated in human readable format.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A method of providing an indicator of potential bit performance in a particular wellbore, comprising:

(a) obtaining forensic wellbore data from at least one previously drilled wellbore which is determined to be comparable to said particular wellbore;

(b) providing an inference engine computer program consisting of executable program instructions, and adapted to utilize a plurality of wellbore parameters, including said forensic wellbore data, which includes at least one rule matrix which defines a plurality of fuzzy sets which establish correspondence between said plurality of wellbore parameters and said indicator of potential bit performance;

(c) loading said inference engine computer program on to a data processing system;

(d) supplying as an input to said inference engine computer program said forensic wellbore data and at least one other of said plurality of wellbore parameters; and (e) utilizing said data processing system to execute program instructions of said inference engine computer program to apply said input to said inference engine computer program and to produce as an output an indicator of potential bit performance in said particular wellbore.

2. The method of providing an indicator of potential bit performance according to claim 1, further comprising:

(f) obtaining empirical wellbore data from said particular wellbore during drilling operations; and (g) additionally supplying said empirical wellbore data as an input to said inference engine computer program.

3. The method of providing an indicator of potential bit performance according to claim 1, wherein said indicator of potential bit performance comprises a numerical indicator of potential bit performance.

4. The method of providing an indicator of potential bit performance according to claim 1, wherein said numerical indicator comprises a numerical value in the range between an upper boundary value and a lower boundary value.

5. The method of providing an indicator of potential bit performance according to claim 2:

(h) wherein said indicator of potential bit performance is generated repeatedly during drilling operations; and (i) wherein said indicator provides an indication of potential bit performance before drilling occurs utilizing said bit.

6. The method of providing an indicator of potential bit performance according to claim 5 further comprising:

(j) altering at least one drilling condition in response to said indicator in order to enhance drilling performance.

7. The method of providing an indicator of potential bit performance according to claim 1, wherein said rule matrix defines a plurality of fuzzy sets.

8. The method of providing an indicator of potential bit performance according to claim 7, wherein said each of said fuzzy sets is identified to at least one corresponding membership function.

9. The method of providing an indicator of potential bit performance according to claim 8, wherein collectively said fuzzy sets define a responsive surface which relates said plurality of wellbore parameters to said indicator of potential bit performance.

10. The method of providing an indicator of potential bit performance according to claim 1:

wherein said rule matrix is composed of a plurality of qualitative descriptions for each said plurality of wellbore parameters; and wherein each of said plurality of qualitative descriptions has a numerical value associated therewith;

wherein said inference engine computer program combines the effects of said plurality of wellbore parameters through said indicator of potential bit performance in said particular wellbore.

11. The method of providing an indicator of potential bit performance according to claim 10, wherein said numerical value which is associated with each of said plurality of qualitative descriptions is adjustable in order to allow modification of said inference engine.

12. The method of providing an indicator of potential bit performance according to claim 11, wherein said numerical value which is associated with each of said plurality of qualitative descriptions is adjustable in order to allow modification of said inference engine, in order to allow calibration of a response surface which defines a universe of possible values for said indicator of potential bit performance.

13. An apparatus for providing an indicator of potential bit performance in a particular wellbore, comprising:
   (a) a data processing system adapted for execution of program instructions;
   (b) an inference engine computer program composed of executable program instructions, and including:
      (1) an inference engine program module which includes a rule matrix which establishes correspondence between a plurality of wellbore parameters and an indicator of potential bit performance and which combines the effects of at least two instinct wellbore parameters utilizing said rule matrix in order to produce as an output an indicator of potential bit performance; and
      (2) an input program module for receiving data corresponding to at least two of said plurality of wellbore parameters and supplying said data to said inference engine program module.

14. The apparatus for providing an indicator of potential bit performance according claim 13, wherein said inference engine further includes:
   (3) an output program which provides in a human-readable format said indicator of potential bit performance.

15. The apparatus for providing an indicator of potential bit performance according to claim 14, wherein said indicator for potential bit performance is presented in human-readable format of a single numeric value from a range of available numeric values between an upper numeric limit and a lower numeric limit.

16. The apparatus for providing an indicator of potential bit performance according to claim 13, wherein said inference engine computer program further includes:
   (3) program instructions for recursively computing said indicator of potential bit performance during drilling operations.

17. The apparatus for providing an indicator of potential bit performance according to claim 13, wherein said input program module of said inference engine computer program comprises:
   (2) an input program module for receiving data corresponding to at least two following distinct wellbore parameters:
      (a) forensic wellbore data from at least one previously drilled wellbore which is determined to be comparable to a subject wellbore; and
      (b) empirical wellbore data related to said subject wellbore; and
for supplying said data to said inference engine program module.

18. The apparatus for providing an indicator of potential bit performance according to claim 13, wherein said inference engine program module includes a rule matrix which establishes correspondence between the two following distinct wellbore parameters:
   (a) forensic wellbore data from at least one previously drilled wellbore which is determined to be comparable to a subject wellbore; and
   (b) empirical wellbore data related to said subject wellbore; and
and an indicator of potential bit performance, by combining the effects of the forensic wellbore data and the empirical wellbore data utilizing said rule matrix in order to produce as an output and indicator of potential bit performance of said subject wellbore.

19. A method of drilling a wellbore, comprising:
   (a) obtaining forensic wellbore data from at least one previously drilled wellbore which is determined to be comparable to a target wellbore;
   (b) providing an inference engine computer program consisting of executable program instructions, and adapted to utilize a plurality of wellbore parameters, including said forensic wellbore data, which includes a rule matrix which establishes correspondence between said plurality of wellbore parameters and an indicator of potential for bit performance;
   (c) loading said inference engine computer program on to a data processing system;
   (d) supplying as an input to said inference engine computer program said forensic wellbore data and at least one other of said plurality of wellbore parameters;
   (e) utilizing said data processing system to execute program instructions of said inference engine computer program to apply said input to said inference engine computer program and to produce as an output said indicator of potential for bit performance in said target wellbore;
   (f) providing a plurality of available rock bits for use in drilling particular portions of said target wellbore, with particular ones of said plurality of available rock bits having different performance attributes related to said indicator of potential for bit performance;
   (g) selecting a particular one of said plurality of available rock bits based at least in part upon said potential for bit performance as predicted by said indicator of potential for bit performance;
   (h) connecting said particular one of said plurality of available rock bits to a drilling string; and
   (i) performing drilling operations.

20. The method drilling a wellbore according to claim 19, further comprising:
   (j) obtaining empirical wellbore data from said target wellbore during drilling operations; and
   (k) additionally supplying said empirical wellbore data as an input to said inference engine computer program.

21. The method of drilling a wellbore according to claim 19, wherein said indicator of potential for bit performance comprises a numerical indicator of potential for bit performance.

22. The method of drilling a wellbore according to claim 21, wherein said numerical indicator comprises a numerical value in the range between an upper boundary value and a lower boundary value.

23. The method of drilling a wellbore according to claim 20:
   (l) wherein said indicator of potential for bit performance is generated repeatedly during drilling operations; and (m) wherein said indicator provides an indication of potential for bit performance before drilling occurs.

24. The method of drilling a wellbore according to claim 23, further comprising:
(n) altering at least one drilling condition in response to said indicator in order to improve bit performance.

25. The method of drilling a wellbore according to claim 24, wherein said at least one drilling condition includes at least one of:
(1) mud type;
(2) bit type;
(3) bit hydraulics;
(4) rotary speed; and
(5) weight on bit.

26. The method of drilling a wellbore according to claim 19, wherein said rule matrix defines a plurality of fuzzy sets.

27. The method of drilling a wellbore according to claim 26, wherein said each of said fuzzy sets is identified to at least one corresponding membership function.

28. The method of drilling a wellbore according to claim 27, wherein collectively said fuzzy sets define a responsive surface which relates said plurality of wellbore parameters to said indicator of potential for bit performance.

29. The method of drilling a wellbore according to claim 19:
wherein said rule matrix is composed of a plurality of qualitative descriptions for each said plurality of wellbore parameters; and
wherein each of said plurality of qualitative descriptions has a numerical value associated therewith; and
wherein said inference engine computer program combines the effects of said plurality of wellbore parameters through said indicator of potential for bit performance in said target wellbore.

30. The method of drilling a wellbore according to claim 29, wherein said numerical value which is associated with each of said plurality of qualitative descriptions is adjustable in order to allow modification of said inference engine.

31. The method of drilling a wellbore according to claim 30, wherein said numerical value which is associated with each of said plurality of qualitative descriptions is adjustable in order to allow modification of said inference engine, in order to allow calibration of a response surface which defines a universe of possible values for said indicator of potential for bit performance.

32. A method of providing an indicator of potential for bit balling in a particular wellbore, comprising:
(a) obtaining forensic wellbore data from at least one previously drilled wellbore which is determined to be comparable to said particular wellbore;
(b) providing an inference engine computer program consisting of executable program instructions, and adapted to utilize a plurality of wellbore parameters, including said forensic wellbore data;
(c) loading said inference engine computer program on to a data processing system;
(d) supplying as an input to said inference engine computer program said forensic wellbore data and at least one other of said plurality of wellbore parameters; and
(e) utilizing said data processing system to execute program instructions of said inference engine computer program to apply said input to said inference engine computer program and to produce as an output an indicator of potential for bit balling in said particular wellbore.

33. The method of providing an indicator of potential for bit balling according to claim 32, further comprising:
(f) obtaining empirical wellbore data from said particular wellbore during drilling operations; and
(g) additionally supplying said empirical wellbore data as an input to said inference engine computer program.

34. The method of providing an indicator of potential for bit balling according to claim 32, wherein said forensic wellbore data includes at least gamma ray log data.

35. The method of providing an indicator of potential for bit balling according to claim 34, wherein said gamma ray log data comprises foot-based gamma ray log data.

36. The method of providing an indicator of potential for bit balling according to claim 33, wherein said empirical wellbore data comprises wellbore pressure.

37. The method of providing an indicator of potential for bit balling according to claim 36, wherein said wellbore pressure comprises bottom hole pressure.

38. The method of providing an indicator of potential for bit balling according to claim 33, wherein said empirical wellbore data comprises calculated or measured values for at least one of:
(a) wellbore pressure;
(b) bottom hole pressure;
(c) porosity;
(d) cation type from cuttings of said particular wellbore; and
(e) gamma ray measurements made during drilling.

39. The method of providing an indicator of potential for bit balling according to claim 32, wherein said forensic wellbore data includes at least one of:
(a) gamma ray log data;
(b) spectral gamma ray log data;
(c) natural gamma ray data; and
(d) spontaneous potential.

40. The method of providing an indicator of potential for bit balling according to claim 32, wherein said indicator of potential for bit balling comprises a numerical indicator of potential for bit balling.

41. The method of providing an indicator of potential for bit balling according to claim 32, wherein said numerical indicator comprises a numerical value in the range between an upper boundary value and a lower boundary value.

42. The method of providing an indicator of potential for bit balling according to claim 33:
(h) wherein said indicator of potential for bit balling is generated repeatedly during drilling operations; and
(i) wherein said indicator provides an indication of potential for bit balling before bit balling occurs.

43. The method of providing an indicator of potential for bit balling according to claim 42, further comprising:
(j) altering at least one drilling condition in response to said indicator in order to diminish the probability of bit balling occurring.

44. The method of providing an indicator of potential for bit balling according to claim 43, wherein said at least one drilling condition includes at least one of:
(1) mud type;
(2) bit type;
(3) bit hydraulics;
(4) rotary speed;
(5) weight on bit;
(6) moduli of elasticity;

(7) compression strength; and (8) clay content.

45. The method of providing an indicator of potential for bit balling according to claim 32, wherein said inference engine comprises a rule matrix.

46. The method of providing an indicator of potential for bit balling according to claim 45, wherein said rule matrix establishes correspondence between said plurality of wellbore parameters and said indicator.

47. The method of providing an indicator of potential for bit balling according to claim 45, wherein said rule matrix defines a plurality of fuzzy sets.

48. The method of providing an indicator of potential for bit balling according to claim 47, wherein said each of said fuzzy sets is identified to at least one corresponding membership function.

49. The method of providing an indicator of potential for bit balling according to claim 48, wherein collectively said fuzzy sets define a responsive surface which relates said plurality of wellbore parameters to said indicator of potential for bit balling.

50. The method of providing an indicator of potential for bit balling according to claim 45:

wherein said rule matrix is composed of a plurality of qualitative descriptions for each said plurality of wellbore parameters; and wherein each of said plurality of qualitative descriptions has a numerical value associated therewith;

wherein said inference engine computer program combines the effects of said plurality of wellbore parameters through said indicator of potential for bit balling in said particular wellbore.

51. The method of providing an indicator of potential for bit balling according to claim 50, wherein said numerical value which is associated with each of said plurality of qualitative descriptions is adjustable in order to allow modification of said inference engine.

52. The method of providing an indicator of potential for bit balling according to claim 51, wherein said numerical value which is associated with each of said plurality of qualitative descriptions is adjustable in order to allow modification of said inference engine, in order to allow calibration of a response surface which defines a universe of possible values for said indicator of potential for bit balling.

53. The method of providing an indicator of potential for bit balling according to claim 32, wherein said plurality of wellbore parameters collectively provide an indication of likely clay content.

54. An apparatus for providing an indicator of potential for bit balling in a particular wellbore, comprising:

(a) a data processing system adapted for execution of program instructions;

(b) an inference engine computer program composed of executable program instructions, and including:

(1) an inference engine program module which includes a rule matrix which establishes correspondence between a plurality of wellbore parameters and an indicator of potential for bit balling and which combines the effects of at least two distinct wellbore parameters utilizing said rule matrix in order to produce as an output an indicator of potential for bit balling; and (2) an input program module for receiving data corresponding to at least two of said plurality of wellbore parameters and supplying said data to said inference engine program module.

55. The apparatus for providing an indicator of potential for bit balling according to claim 54, wherein said inference engine further includes:

(3) an output program which provides in a human-readable format said indicator of potential for bit balling.

56. The apparatus for providing an indicator of potential for bit balling according to claim 55, wherein said indicator for potential bit balling is presented in human-readable format of a single numeric value from a range of available numeric values between an upper numeric limit and a lower numeric limit.

57. The apparatus for providing an indicator of potential for bit balling according to claim 54, wherein said inference engine computer program further includes:

(3) program instructions for recursively computing said indicator of potential for bit balling during drilling operations.

58. The apparatus for providing an indicator of potential for bit balling according to claim 54, wherein said input program module of said inference engine computer program comprises:

(2) an input program module for receiving data corresponding to at least two following distinct wellbore parameters:

(a) forensic wellbore data from at least one previously drilled wellbore which is determined to be comparable to a subject wellbore; and (b) empirical wellbore data related to said subject wellbore; and for supplying said data to said inference engine program module.

59. The apparatus for providing an indicator of potential for bit balling according to claim 54, wherein said inference engine program module includes a rule matrix which establishes correspondence between the two following distinct wellbore parameters:

(a) forensic wellbore data from at least one previously drilled wellbore which is determined to be comparable to a subject wellbore; and (b) empirical wellbore data related to said subject wellbore; and and an indicator of potential for bit balling, by combining the effects of the forensic wellbore data and the empirical wellbore data utilizing said rule matrix in order to produce as an output and indicator of potential for bit balling of said subject wellbore.

60. A method of drilling a wellbore, comprising:

(a) obtaining forensic wellbore data from at least one previously drilled wellbore which is determined to be comparable to a target wellbore;

(b) providing an inference engine computer program consisting of executable program instructions, and adapted to utilize a plurality of wellbore parameters, including said forensic wellbore data;

(c) loading said inference engine computer program on to a data processing system;

(d) supplying as an input to said inference engine computer program said forensic wellbore data and at least one other of said plurality of wellbore parameters;

(e) utilizing said data processing system to execute program instructions of said inference engine computer program to apply said input to said inference engine computer program and to produce as an output an indicator of potential for bit balling in said target wellbore;

(f) providing a plurality of available rock bits for use in drilling particular portions of said target wellbore, with particular ones of said plurality of available rock bits having different suitability for use with particular different potentials for bit balling as reflected in said indicator of potential for bit balling;

(g) selecting a particular one of said plurality of available rock bits based at least in part upon said potential for bit balling as predicted by said indication of potential for bit balling;

(h) connecting said particular one of said plurality of available rock bits to a drillstring; and (i) performing drilling operations.

61. The method of drilling a wellbore according to claim 60, further comprising:

(j) obtaining empirical wellbore data from said target wellbore during drilling operations; and (k) additionally supplying said empirical wellbore data as an input to said inference engine computer program.

62. The method of drilling a wellbore according to claim 60, wherein said forensic wellbore data includes at least gamma ray log data.

63. The method of drilling a wellbore according to claim 62, wherein said gamma ray log data comprises foot-based gamma ray log data.

64. The method of drilling a wellbore according to claim 61, wherein said empirical wellbore data comprises wellbore pressure.

65. The method of drilling a wellbore according to claim 64, wherein said wellbore pressure comprises bottom hole pressure.

66. The method of drilling a wellbore according to claim 61, wherein said empirical wellbore data comprises at least one of:

(a) wellbore pressure;

(b) bottom hole pressure;

(c) porosity; and (d) cation type from cuttings of said particular wellbore.

67. The method of drilling a wellbore according to claim 60, wherein said forensic wellbore data includes at least one of:

(a) gamma ray log data; and (b) spectral gamma ray log data.

68. The method of drilling a wellbore according to claim 60, wherein said indicator of potential for bit balling comprises a numerical indicator of potential for bit balling.

69. The method of drilling a wellbore according to claim 60, wherein said numerical indicator comprises a numerical value in the range between an upper boundary value and a lower boundary value.

70. The method of drilling a wellbore according to claim 61:

(l) wherein said indicator of potential for bit balling is generated repeatedly during drilling operations; and (m) wherein said indicator provides an indication of potential for bit balling before bit balling occurs.

71. The method of drilling a wellbore according to claim 70 further comprising:

(n) altering at least one drilling condition in response to said indicator in order to diminish the probability of bit balling occurring.

72. The method of drilling a wellbore according to claim 71, wherein said at least one drilling condition includes at least one of:

(1) mud type;

(2) bit type;

(3) bit hydraulics;

(4) rotary speed; and (5) weight on bit.

73. The method of drilling a wellbore according to claim 60, wherein said inference engine comprises a rule matrix.

74. The method of drilling a wellbore according to claim 73, wherein said rule matrix establishes correspondence between said plurality of wellbore parameters and said indicator.

75. The method of drilling a wellbore according to claim 73, wherein said rule matrix defines a plurality of fuzzy sets.

76. The method of drilling a wellbore according to claim 75, wherein said each of said fuzzy sets is identified to at least one corresponding membership function.

77. The method of drilling a wellbore according to claim 76, wherein collectively said fuzzy sets define a responsive surface which relates said plurality of wellbore parameters to said indicator of potential for bit balling.

78. The method of drilling a wellbore according to claim 73:

wherein said rule matrix is composed of a plurality of qualitative descriptions for each said plurality of wellbore parameters; and wherein each of said plurality of qualitative descriptions has a numerical value associated therewith;

wherein said inference engine computer program combines the effects of said plurality of wellbore parameters through said indicator of potential for bit balling in said target wellbore.

79. The method of drilling a wellbore according to claim 78, wherein said numerical value which is associated with each of said plurality of qualitative descriptions is adjustable in order to allow modification of said inference engine.

80. The method of drilling a wellbore according to claim 79, wherein said numerical value which is associated with each of said plurality of qualitative descriptions is adjustable in order to allow modification of said inference engine, in order to allow calibration of a response surface which defines a universe of possible values for said indicator of potential for bit balling.

* * * * *